(12) United States Patent
Tsunoya et al.

(10) Patent No.: US 10,994,488 B2
(45) Date of Patent: May 4, 2021

(54) APPARATUS FOR MANUFACTURING THREE-DIMENSIONALLY SHAPED OBJECT AND METHOD OF MANUFACTURING THREE-DIMENSIONALLY SHAPED OBJECT

(71) Applicant: Seiko Epson Corporation, Tokyo (JP)

(72) Inventors: Akihiko Tsunoya, Okaya (JP); Eiji Okamoto, Matsumoto (JP)

(73) Assignee: SEIKO EPSON CORPORATION

( * ) Notice: Subject to any disclaimer, the term of this patent is extended or adjusted under 35 U.S.C. 154(b) by 100 days.

(21) Appl. No.: 16/275,410

(22) Filed: Feb. 14, 2019

(65) Prior Publication Data

US 2019/0248077 A1 Aug. 15, 2019

(30) Foreign Application Priority Data

Feb. 15, 2018 (JP) .............................. JP2018-025207

(51) Int. Cl.
| | |
|---|---|
| *B29C 64/393* | (2017.01) |
| *B33Y 30/00* | (2015.01) |
| *B33Y 50/02* | (2015.01) |
| *B22F 3/00* | (2021.01) |
| *B28B 1/00* | (2006.01) |

(Continued)

(52) U.S. Cl.
CPC ............ *B29C 64/393* (2017.08); *B22F 3/008* (2013.01); *B28B 1/001* (2013.01); *B28B 17/0081* (2013.01); *B29C 64/209* (2017.08); *B33Y 30/00* (2014.12); *B33Y 50/02* (2014.12)

(58) Field of Classification Search
CPC ........ B29C 64/393; B33Y 30/00; B33Y 50/02
See application file for complete search history.

(56) References Cited

U.S. PATENT DOCUMENTS 6,259,962 B1 7/2001 Gothait
2006/0061618 A1* 3/2006 Hernandez ........... B41J 2/16538
347/29

(Continued)

FOREIGN PATENT DOCUMENTS

| JP | 2015-221576 A | 12/2015 |
| JP | 2016-064538 A | 4/2016 |
| JP | 2017-077671 A | 4/2017 |

*Primary Examiner* — Joseph S Del Sole
*Assistant Examiner* — Yung-Sheng M Tsui
(74) *Attorney, Agent, or Firm* — Harness, Dickey & Pierce, P.L.C.

(57) ABSTRACT

A three-dimensional modeling apparatus includes a plurality of ejection sections that eject shaping material on the basis of shaping data, a detection section detecting an ejection state of the shaping material from the ejection section, a maintenance section that performs maintenance of the ejection section, and a control section that controls the ejection section, the detection section, and the maintenance section, in which, when the detection section detects an ejection abnormality of the shaping material in any of the ejection sections, the control section causes the maintenance section to perform the maintenance of the ejection section in which the ejection abnormality is detected, regenerates the shaping data, and causes the ejection section in which the ejection abnormality is not detected to eject the shaping material at a position where the shaping material is to be ejected from the ejection section in which the ejection abnormality is detected.

5 Claims, 11 Drawing Sheets

(51) Int. Cl.
 *B28B 17/00* (2006.01)
 *B29C 64/209* (2017.01)

(56) References Cited

U.S. PATENT DOCUMENTS

| | | | |
|---|---|---|---|
| 2015/0079214 A1* | 3/2015 | Shi | B29C 67/0059 425/130 |
| 2015/0177158 A1* | 6/2015 | Cheverton | G01N 15/0227 700/119 |
| 2015/0290875 A1* | 10/2015 | Mark | B29C 64/118 264/138 |
| 2016/0082654 A1 | 3/2016 | Hakkaku | |
| 2018/0345583 A1* | 12/2018 | Leng | G09B 23/286 |
| 2018/0354192 A1* | 12/2018 | Iwase | B29C 64/245 |

* cited by examiner

APPARATUS FOR MANUFACTURING THREE-DIMENSIONALLY SHAPED OBJECT AND METHOD OF MANUFACTURING THREE-DIMENSIONALLY SHAPED OBJECT

This application claims priority under 35 U.S.C. § 119 to Japanese Patent Application No. 2018-025207 filed on Feb. 15, 2018, the entire disclosure of which is expressly incorporated by reference herein.

BACKGROUND

1. Technical Field

The present invention relates to an apparatus for manufacturing a three-dimensionally shaped object and a method of manufacturing the three-dimensionally shaped object.

2. Related Art

In the related art, various apparatuses for manufacturing a three-dimensionally shaped object are in use. Among them, an apparatus for manufacturing a three-dimensionally shaped object that manufactures a three-dimensionally shaped object by ejecting a shaping material of the three-dimensionally shaped object from an ejection section to form layers and stacking the layers.

For example, in JP-A-2015-221576, a three-dimensional printing apparatus (apparatus for manufacturing a three-dimensionally shaped object) including a printing head (ejection section) that distributes boundary materials (shaping materials) of a three-dimensionally shaped object into a layer form is disclosed.

In an apparatus for manufacturing a three-dimensionally shaped object that ejects a shaping material of a three-dimensionally shaped object from an ejection section, an ejection state of the shaping material of three-dimensionally shaped object from the ejection section deteriorates to result in an ejection abnormality sometimes. For this reason, in such an apparatus for manufacturing a three-dimensionally shaped object, a maintenance section for performing maintenance of the ejection section is provided sometimes. However, when it becomes necessary to perform the maintenance at the time of layer formation, the apparatus for manufacturing a three-dimensionally shaped object in the related art as shown in JP-A-2015-221576 is configured to discontinue the layer formation for the moment, perform the maintenance of the ejection section and then resume the layer formation. For this reason, in the apparatus for manufacturing a three-dimensionally shaped object in the related art, manufacturing efficiency of the three-dimensionally shaped object accompanying the maintenance of the ejection section declines.

SUMMARY

An advantage of some aspects of the invention is an alleviation of a decline of manufacturing efficiency of a three-dimensionally shaped object accompanying maintenance of an ejection section.

According to an aspect of the invention, there is provided an apparatus for manufacturing a three-dimensionally shaped object by stacking layers, and the apparatus including a plurality of ejection sections that eject shaping material on the basis of shaping data of the three-dimensionally shaped object, a detection section capable of detecting an ejection state of the shaping material from the ejection section, a maintenance section that performs maintenance of the ejection section, a control section that controls the ejection section, the detection section, and the maintenance section, in which, when the detection section detects an ejection abnormality of the shaping material in any of the ejection sections, the control section causes the maintenance section to perform maintenance of an abnormal ejection section in which the ejection abnormality is detected, and causes a normal ejection section in which the ejection abnormality is not detected to eject the shaping material at a position where the shaping material is to be ejected from the abnormal ejection section while the maintenance of the abnormal ejection section is performed by the maintenance section.

With this configuration, a plurality of ejection sections are provided. When an ejection abnormality is detected, the maintenance of the abnormal ejection section in which the ejection abnormality is detected is performed, and the shaping material is ejected from a normal ejection section at a position where the shaping material is to be ejected from the abnormal ejection section while the maintenance of the abnormal ejection section is performed. Therefore, the layer formation can be less interrupted and a decline in manufacturing efficiency of a three-dimensionally shaped object can be suppressed.

In the apparatus for manufacturing a three-dimensionally shaped object, in which, when the detection section detects the ejection abnormality of the shaping material in any of the ejection sections, the control section regenerates the shaping data so as to cause the normal ejection section to eject the shaping material at a position where the shaping material is to be ejected from the abnormal ejection section.

With this configuration, the shaping data is regenerated so that the shaping material is ejected by the normal ejection section at the position where the shaping material is to be ejected from the abnormal ejection section. Therefore, the shaping data by which the shaping material is ejected from the abnormal ejection section is revised into the shaping data by which the shaping material is to be ejected from a normal ejection section so that the shaping material can be ejected by the normal ejection section as deemed appropriate at the position where the shaping material is to be ejected from the abnormal ejection section.

In the apparatus for manufacturing a three-dimensionally shaped object, when the detection section detects the ejection abnormality of the shaping material in any of the ejection sections, the control section may regenerate the shaping data for each one layer.

With this configuration, since the shaping data is regenerated for each layer of one layer, as soon as the abnormal ejection section turns normal by the maintenance, it becomes possible for the shaping material to be ejected from the normalized ejection section.

In the apparatus for manufacturing a three-dimensionally shaped object, when the detection section detects the ejection abnormality of the shaping material in any of the ejection sections, the control section may change the number of layers for which the shaping data is to be regenerated on the basis of a state of the ejection abnormality detected by the detection section.

With this configuration, the number of layers for which the shaping data is set to be regenerated is changed on the basis of the state of the ejection abnormality. Therefore, in the case of a serious ejection abnormality such as no ejection at all, for example, it takes time to perform maintenance so that the shaping data is set to be regenerated for a large number of layers, and in the case of a light ejection abnormality such as the ejection amount being slightly less than usual, it does not take much time to perform maintenance so that the shaping data is set to be regenerated for a small number of layers, and so forth. Therefore, the decline in the manufacturing efficiency of a three-dimensionally shaped object can be suppressed efficiently.

In the apparatus for manufacturing a three-dimensionally shaped object, the maintenance section may execute a plurality of types of maintenance contents, and, when the detection section detects the ejection abnormality of the shaping material in any of the ejection sections, the control section may change the maintenance contents to be executed by the maintenance section on the basis of a state of the ejection abnormality detected by the detection section.

With this configuration, a plurality of types of maintenance contents can be executed, and the maintenance contents are changed on the basis of the state of the ejection abnormality so that the maintenance of the abnormal ejection section can be performed efficiently.

In the apparatus for manufacturing a three-dimensionally shaped object, the control section may cause the ejection section to eject the shaping material at a position different from a shaping position of the three-dimensionally shaped object and cause the detection section to detect an ejection state of the ejection section.

With this configuration, since the ejection state of the ejection section is detected by the ejection of the shaping materials at a position different from the shaping position of the three-dimensionally shaped object, the ejection state of the ejection section is accurately detected free from the impact of the state of the lower layer accompanying the stacking of the three-dimensionally shaped object.

In the apparatus for manufacturing a three-dimensionally shaped object, the control section may cause the detection section to detect an ejection state of the ejection section on the basis of a shape of the three-dimensionally shaped object.

With this configuration, since the ejection state of the ejection section is detected on the basis of the shape of the three-dimensionally shaped object, the ejection state of the ejection section can be detected efficiently.

In the apparatus for manufacturing a three-dimensionally shaped object provided with a plurality of ejection sections that eject the shaping material on the basis of the shaping data of the three-dimensionally shaped object, the detection section capable of detecting the ejection state of the shaping material from the ejection section, and the maintenance section that performance maintenance of the ejection section, a method of manufacturing the three-dimensionally shaped object is the method of manufacturing the three-dimensionally shaped object by stacking layers, the method including, when the detection section detects an ejection abnormality of the shaping material in any of the ejection sections, causing the normal ejection section in which no ejection abnormality is detected to eject the shaping material at a position where the shaping material is to be ejected from the abnormal ejection sections while the maintenance of the abnormal ejection section is performed by the maintenance section.

With this configuration, when an ejection abnormality is detected, the apparatus for manufacturing the three-dimensionally shaped object provided with a plurality of ejection sections causes that the maintenance of the abnormal ejection section in which the ejection abnormality is detected is performed and causes the normal ejection section to eject the shaping material at a position where the shaping material is to be ejected from the abnormal ejection section while the maintenance of the abnormal ejection section is performed. Therefore, the interruption of the formation of the layer can be suppressed, and the decline of the manufacturing efficiency of the three-dimensionally shaped object can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the embodiments of the aspects of the invention will be described with reference to the drawings.

FIGS. 1 to 4 are schematic configuration views showing a configuration of an apparatus for manufacturing a three-dimensionally shaped object in accordance with an embodiment of the invention.

Figure 1:
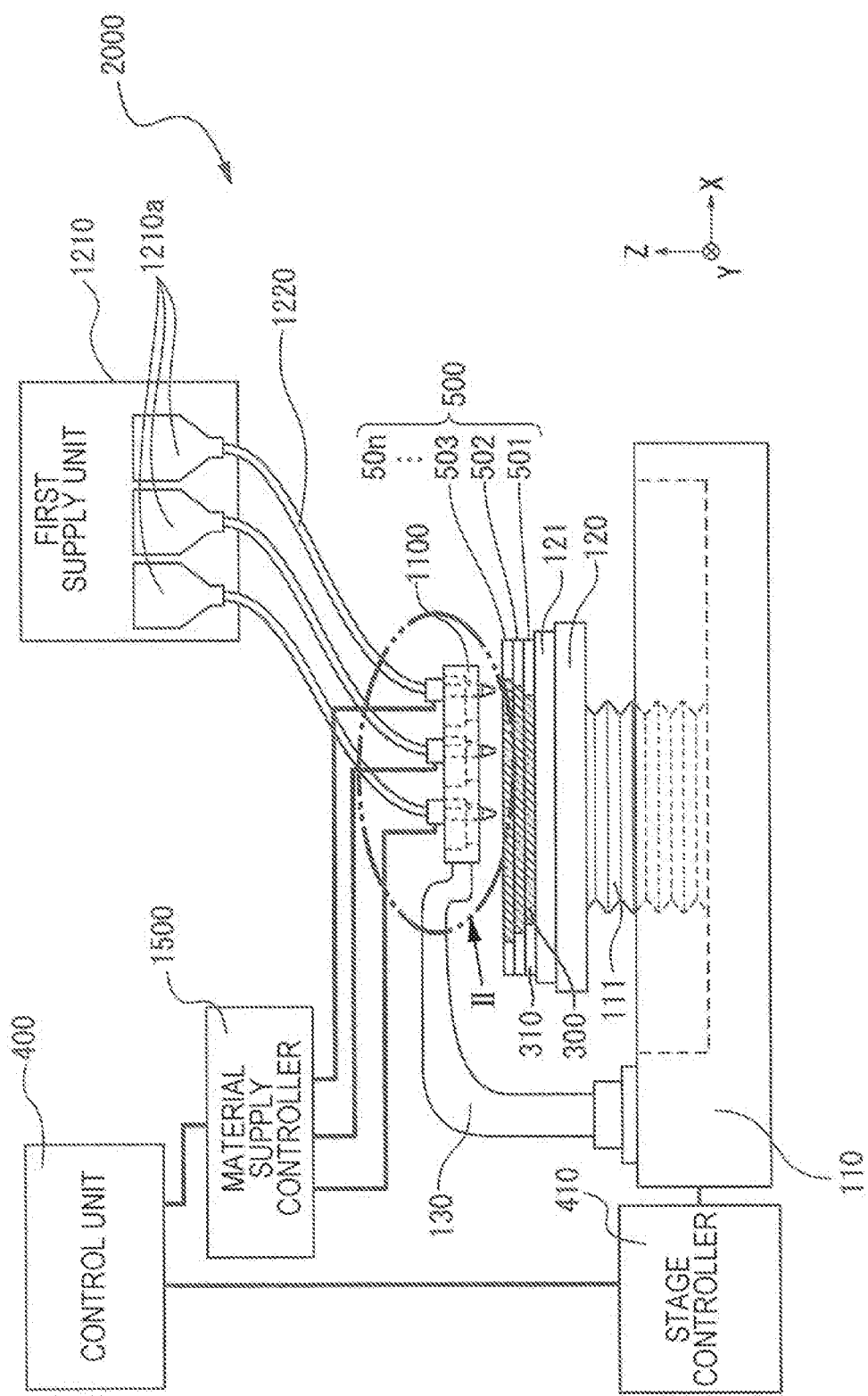
FIG. 1 is a schematic configuration view showing a configuration of an apparatus for manufacturing a three-dimensionally shaped object in accordance with an embodiment of the invention.
Figure 2:
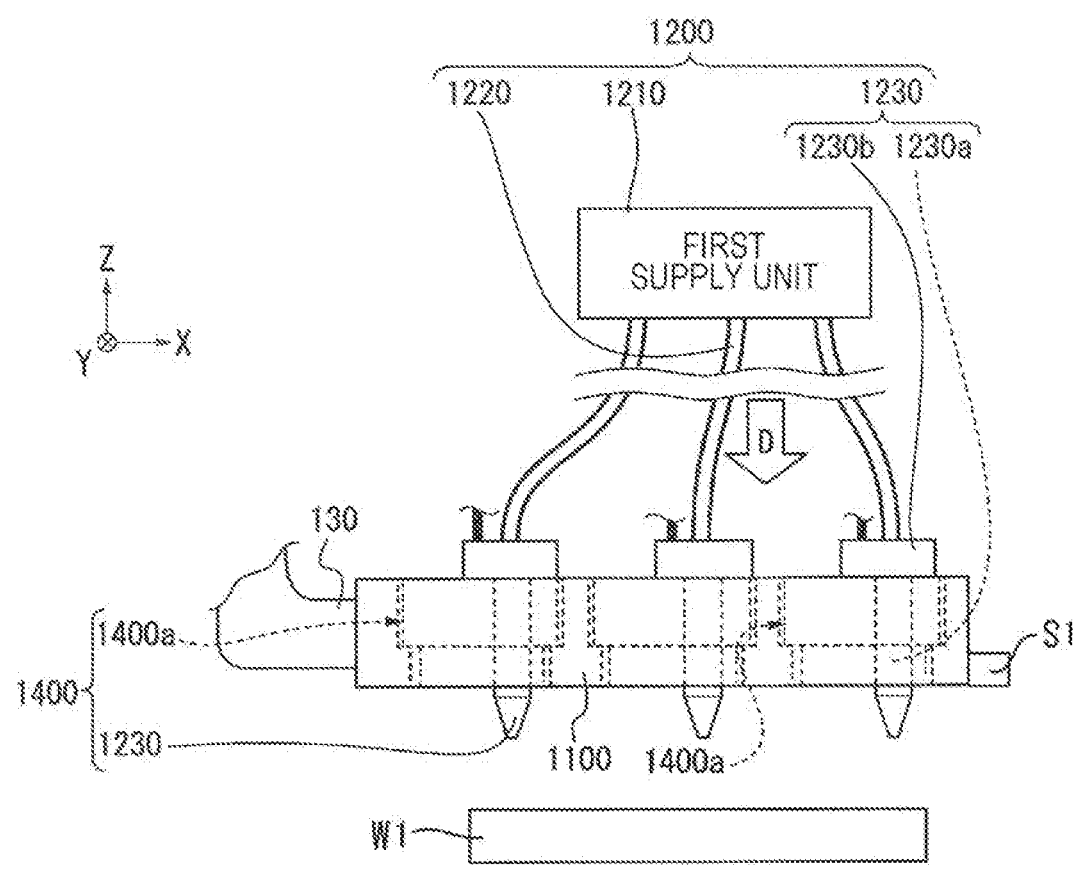
FIG. 2 is an enlarged view of a portion II shown in FIG. 1.
Figure 3:
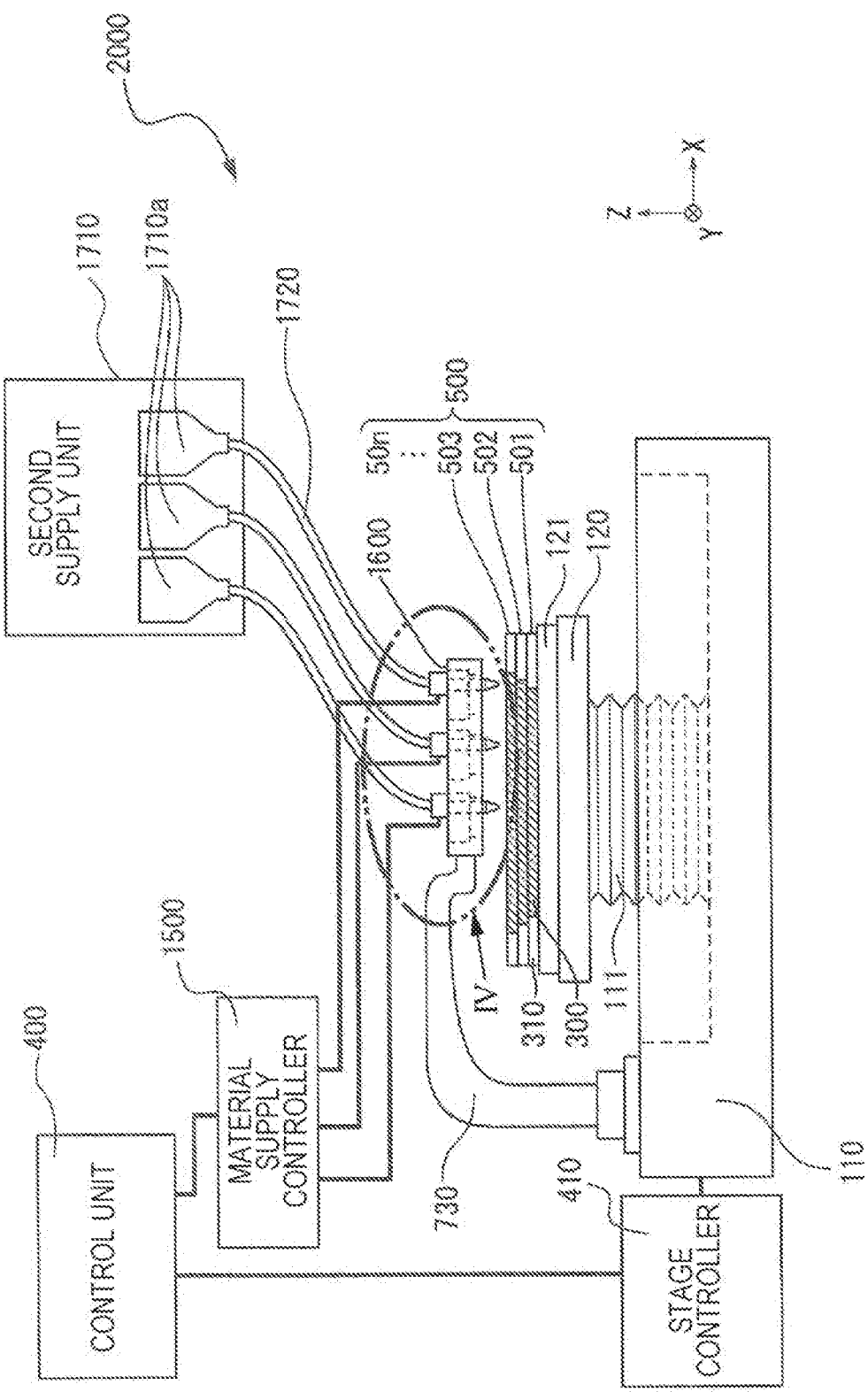
FIG. 3 is a schematic configuration view showing a configuration of an apparatus for manufacturing a three-dimensionally shaped object in accordance with an embodiment of the invention.
Figure 4:
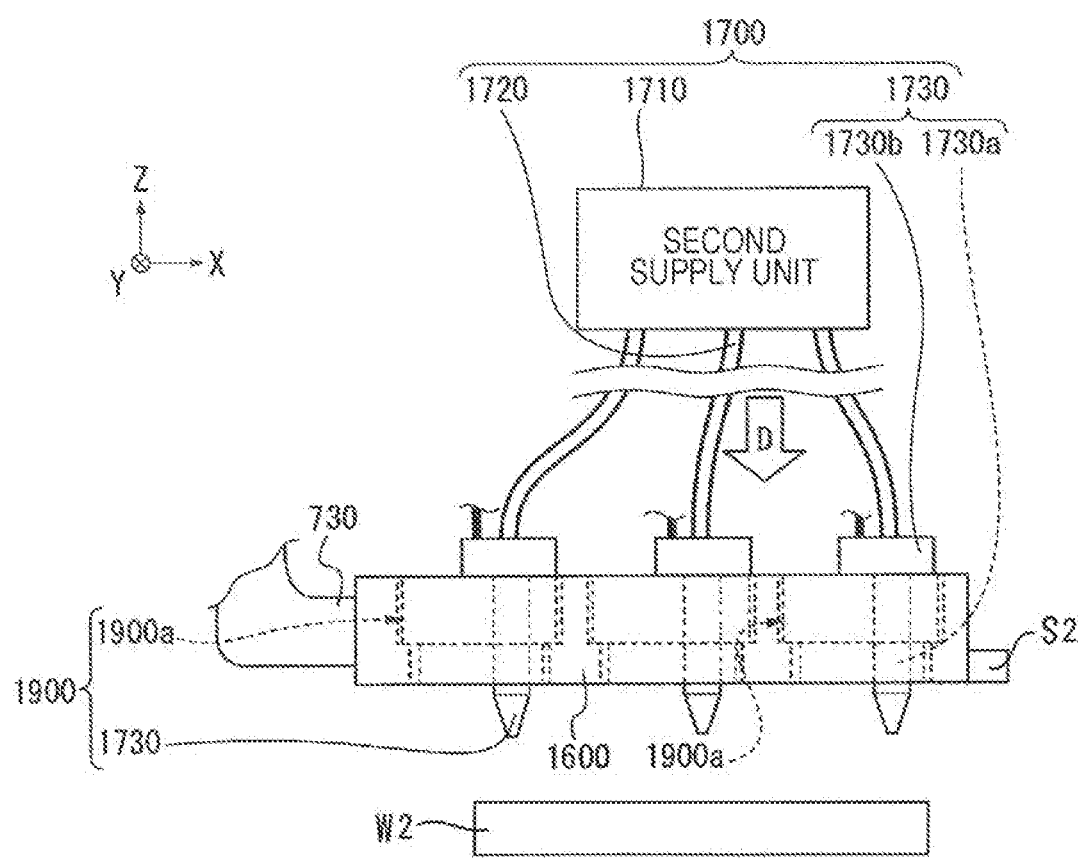
FIG. 4 is an enlarged view of a portion IV shown in FIG. 3.

Here, the apparatus for manufacturing a three-dimensionally shaped object in accordance with the embodiment includes a plurality (two) of material supply sections (head bases). FIGS. 1 and 2 are views showing only one material supply section of the two. Also, FIGS. 3 and 4 are views showing only the other material supply section of the two. Here, the material supply section shown in FIGS. 1 and 2 and the material supply section shown in FIGS. 3 and 4 are configured to be capable of supplying the same shaping material.

The "three-dimensional shaping" in the present specification means forming a so-called three-dimensionally shaped object and includes, for example, forming a shape having a thickness even in a flat plate shape, a so-called two-dimensional shape. Further, "to support" means to include not only supporting from below but supporting sideways and supporting from above.

Further, the shaping material of the three-dimensionally shaped object in accordance with the embodiment is a paste (flowable material). However, such a shaping material is not a limit. A compound or the like which is solid in a filamentous shape or a pellet shape at a normal temperature and turns into a fluid state by being heated may be used as a shaping material.

The apparatus for manufacturing the three-dimensionally shaped object 2000 (hereinafter referred to as a forming apparatus 2000) shown in FIGS. 1 and 3 is provided with a base 110 and a stage 120 provided to be movable in X, Y, and Z directions shown in the drawings or to be drivable in a rotation direction around a Z-axis by a driving device 111 as a driving means provided in the base 110.

As shown in FIGS. 1 and 2, a head base support portion 130 to which a head base 1100 as an ejection section is held fixed is provided, and the head base 1100 has a plurality of head units 1400, each fixed to the base 110 at one tip end and provided at the other tip end with the first discharge section 1230 that discharges the shaping material.

Also, as shown in FIGS. 3 and 4, a head base support portion 730 to which a head base 1600 as an ejection section is held fixed is provided, and the head base 1600 has a plurality of head units 1900, each fixed to the base 110 at one tip end and provided at the other tip end with the second discharge section 1730 that discharges the shaping material.

Here, the head base 1100 and the head base 1600 are provided in parallel to each other in the XY plane. The head base 1600 is configured to be capable of moving to follow the movement of the head base 1100 with respect to the stage 120. However, the head base 1100 and the head base 1600 are configured to be capable of moving independently of the stage 120. Here, "the head base 1600 moves to follow the movement of the head base 1100 with respect to the stage 120" means to also include a case where the head base 1100 and the head base 1600 are positioned in a row and the stage 120 moves with respect to the stationary head base 1100 and head base 1600.

Further, the first discharge section 1230 and the second discharge section 1730 have the same configuration.

On the stage 120, layers 501, 502, and 503 are formed in the process of forming the three-dimensionally shaped object 500 (layer-stacked body of a three-dimensionally shaped object). The formation of the three-dimensionally shaped object 500 may be irradiated with thermal energy by an electromagnetic wave irradiation section or the like. In such a configuration, a sample plate 121 with heat resistance may be used in the formation of the three-dimensionally shaped object 500 on the sample plate 121 to protect the stage 120 from heat. The sample plate 121 in accordance with the embodiment is made of a metal which is strong and easy to manufacture with. However, for example, a ceramic plate can be used as the sample plate 121 to secure high heat resistance and, further, when degreasing, sintering or the like is performed, reactivity to the constituent material powder of the three-dimensionally shaped object 500 can be lowered so that deterioration of the three-dimensionally shaped object 500 can be prevented. Further, for the convenience of description, three layers of layers 501, 502, and 503 are given as examples in FIGS. 1 and 3, but layers are stacked till the target three-dimensionally shaped object 500 is shaped (up to layer 50$n$ in FIGS. 1 and 3).

Here, each of the layers 501, 502, 503, . . . , and 50$n$ is composed of the first layer 310 formed by the discharge of the shaping material from the first discharge section 1230 and the second layer 300 formed by the discharge of the shaping material from the second discharge section 1730.

Further, the forming apparatus 2000 in accordance with the embodiment is the apparatus for manufacturing a three-dimensionally shaped object capable of forming a plurality of layers, layers 501, 502, 503, . . . , and 50$n$ with the shaping material including the constituent material powder of the three-dimensionally shaped object 500. However, depending on the shape of the three-dimensionally shaped object 500 to be manufactured, a support layer forming section (not shown) is configured to be capable of forming each of the layers (layers 501, 502, 503, . . . , and 50$n$) with the support layer forming materials for supporting the first layer 310 and the second layer 300.

Further, FIG. 2 is an enlarged conceptual view of a portion II showing the head base 1100 shown in FIG. 1. As shown in FIG. 2, the head base 1100 holds a plurality of head units 1400. A single head unit 1400 is configured such that the first discharge section 1230 provided in the first supply device 1200 is held by a holding jog 1400$a$, the details to be described later. The first discharge section 1230 is provided with the discharge nozzles 1230$a$ and the discharge driving section 1230$b$ which is caused by the material supply controller 1500 to discharge the shaping material from the discharge nozzle 1230$a$. Further, a wiper W1 for the maintenance (wiping, to be specific) of the head base 1100 (the first discharge section 1230, to be specific) is provided. Furthermore, a detection section S1 capable of detecting an ejection state of the shaping material from the head base 1100 (the first discharge section 1230) is provided.

FIG. 4 is an enlarged conceptual view of a portion IV showing the head base 1600 shown in FIG. 3. As shown in FIG. 4, the head base 1600 holds a plurality of head units 1900. The head unit 1900 is configured such that the second discharge section 1730 provided in the second supply device 1700 is held by the holding jig 1900$a$. The second discharge section 1730 is provided with the discharge nozzle 1730$a$ and the discharge driving section 1730$b$ which is caused by the material supply controller 1500 to discharge the shaping material from the discharge nozzle 1730$a$. Further, the wiper W2 for maintaining (wiping, to be specific) the head base 1600 (the second discharge section 1730, to be specific) is provided. Furthermore, a detection section S2 capable of detecting the ejection state of the shaping material from the head base 1600 (the second discharge section 1730) is provided.

Further, the maintenance section in the forming apparatus 2000 in accordance with the embodiment is the wiper W1 and the wiper W2 that wipe the head base 1100 and the head base 1600 as an ejection section, but the configuration of the maintenance section is not particularly limited thereto. For example, the wiper W1 and the wiper W2 in accordance with the embodiment are wipers composed of cloth, but may be made of resin or the like. Furthermore, caps for capping the head base 1100 and the head base 1600, a suction mechanism for sucking the shaping material of the head base 1100 and the head base 1600 from the first discharge section 1230 and the second discharge section 1730, or the like may be provided.

The "maintenance" according to an aspect of the invention means to include all the works intended to remove an ejection abnormality when the ejection abnormality (such as no ejection at all or the ejection amount deviates from the target amount) occurs in the ejection section.

Further, the detection section S1 and the detection section S2 are all configured to be formed in the ejection section (the head base 1100 and the head base 1600) so as to move together with the ejection section, and are 3D sensors capable of capturing (capturing) each layer (layers 501, 502, 503, . . . , and 50n) stereoscopically. However, there is no particular limitation to the configuration and the formation position of the detection section.

As shown in FIGS. 1 and 2, the first discharge section 1230 is connected to the first supply unit 1210 that accommodates the shaping materials made to correspond to each of the head units 1400 held by the head base 1100 by the supply tube 1220. Then, a predetermined shaping material is supplied from the first supply unit 1210 to the first discharge section 1230. In the first supply unit 1210, the shaping material including the constituent material powder of the three-dimensionally shaped object 500 to be shaped by the forming apparatus 2000 in accordance with the embodiment is accommodated in the first accommodation section 1210a, and each of the first accommodation section 1210a is connected to each of the first discharge section 1230 by the supply tube 1220. In this way, a plurality of different types of shaping materials can be supplied from the head base 1100, each provided with the respective first accommodation section 1210a.

As shown in FIGS. 3 and 4, the second discharge section 1730 is connected to the second supply unit 1710 that accommodates the shaping materials made to correspond to each of the head units 1900 held by the head base 1600 by the supply tube 1720. Then a predetermined shaping material is supplied from the second supply unit 1710 to the second discharge section 1730. In the second supply unit 1710, the shaping material of the three-dimensionally shaped object 500 to be shaped by the forming apparatus 2000 in accordance with the embodiment is included in the second accommodation section 1710a, and each of the second accommodation sections 1710a is connected to each of the second discharge section 1730 by the supply tube 1720. In this way, a plurality of different types of shaping materials can be supplied from the head base 1600, each provided with the respective second accommodation section 1710a. However, the shaping materials that can be supplied from the head base 1100 and the shaping material that can be supplied from the head base 1600 are made to be the same shaping material. For example, when one type of shaping material is supplied from the head base 1100, the same type of shaping material is made to be supplied from the head base 1600. When a plurality of types of shaping materials are supplied from the head base 1100, a plurality of types of shaping materials are also made to be supplied from the head base 1600, each of the shaping materials being made to be the same type of shaping material to be supplied from the head base 1100 respectively.

Details of specific examples of the components of the shaping materials to be used in the forming apparatus 2000 in accordance with the embodiment will be described later.

In the forming apparatus 2000, a control unit 400 as a control section that controls the stage 120 described above, the first discharge section 1230 provided in the first supply device 1200, and the second discharge section 1730 provided in the second supply device 1700 on the basis of the shaping data of the three-dimensionally shaped object 500 to be output from a data output device of, for example, a personal computer (not shown) or the like is provided. The control unit 400 controls the stage 120, the first discharge section 1230 to be driven and operated in conjunction with each other and controls the stage 120 and the second discharge section 1730 to be driven and operated in conjunction with each other. Further, the control unit 400 controls the detection section S1 to detect (capture) the first layer 310 formed by the first discharge section 1230 in accordance with the driving of the first discharge section 1230 and controls the detection section S2 to detect (capture) the second layer 300 formed by the second discharge section 1730 in accordance with the driving of the second discharge section 1730. Furthermore, the control unit 400 controls the movement of the wiper W1 and the wiper W2 and controls the wiper W1 and the wiper W2 to wipe the head base 1100 and the head base 1600.

The signals for controlling the start and stop of movement, moving direction, moving distance, moving speed, and the like of the stage 120 are generated in a stage controller 410 and transmitted to the driving device 111 provided in the base 110 so that the stage 120 movably provided in the base 110 moves in the X, Y, and Z directions shown in the drawings on the basis of the control signal from the control unit 400. In the first discharge section 1230 provided in the head unit 1400, the signal for controlling the discharge amount of the material from the discharge nozzle 1230a in the discharge driving section 1230b provided in the first discharge section 1230 is generated in the material supply controller 1500 on the basis of the control signal from the control unit 400 so that the predetermined amount of shaping material is discharged from the discharge nozzle 1230a by the generated signal.

Similarly, the signal is generated for controlling the material discharge amount from the discharge nozzle 1730a in the discharge driving section 1730b provided in the second discharge section 1730 is generated in the material supply controller 1500 so that, in the second discharge section 1730 provided in the head unit 1900, on the basis of the control signal from the control unit 400, the predetermined amount shaping material is discharged from the discharge nozzle 1730a by the generated signal.

Next, the head unit 1400 will be described in further detail. The head unit 1900 has the same configuration as the head unit 1400. Therefore, a detailed description of the configuration of the head unit 1900 will not be repeated.

Figure 5:
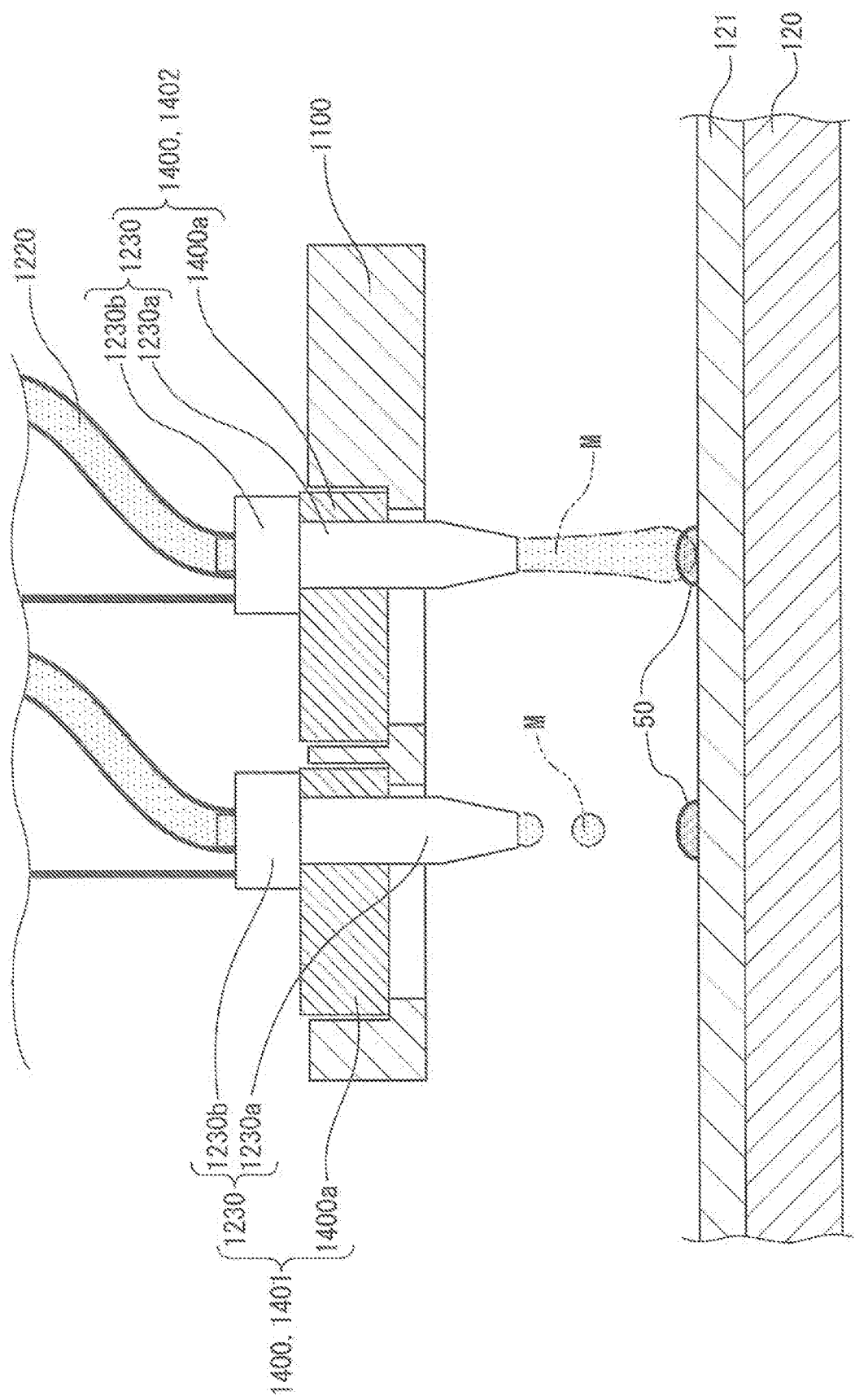
FIG. 5 is a schematic perspective view of a head base in accordance with an embodiment of the invention.
Figure 6:
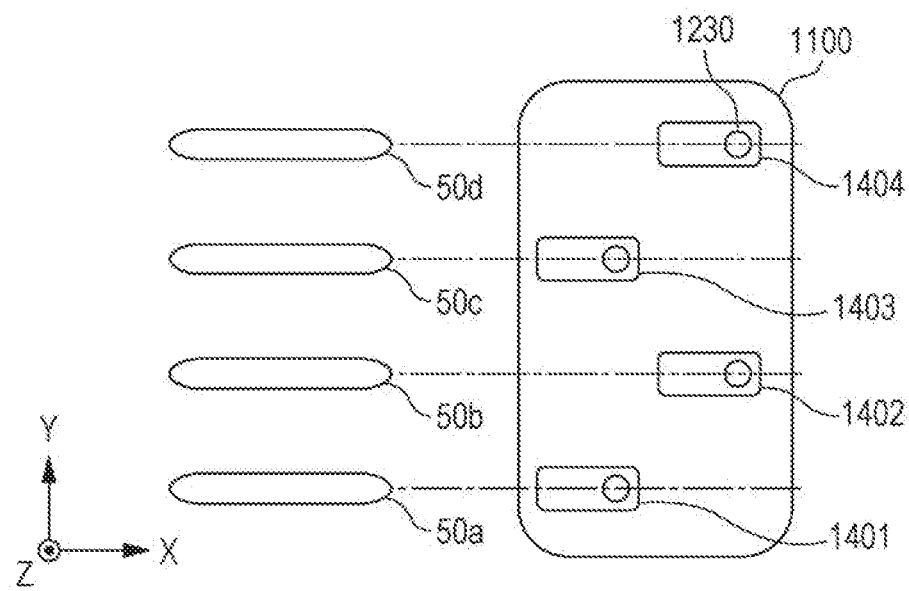
FIG. 6 is a plan view conceptually describing a relationship between an arrangement of a head unit and a formation configuration of a three-dimensionally shaped object in accordance with an embodiment of the invention.
Figure 7:
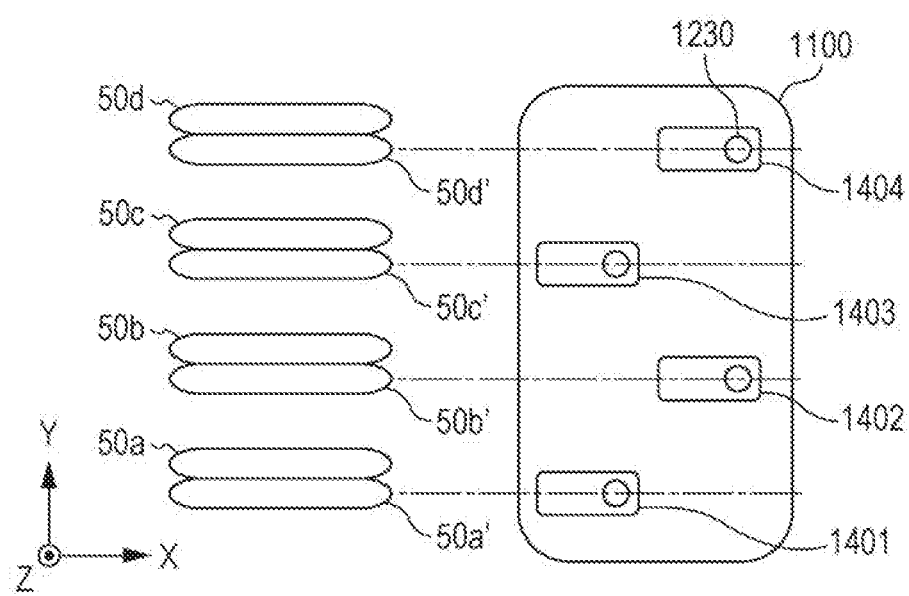
FIG. 7 is a plan view conceptually describing a relationship between an arrangement of a head unit and a formation configuration of a three-dimensionally shaped object in accordance with an embodiment of the invention.
Figure 8:
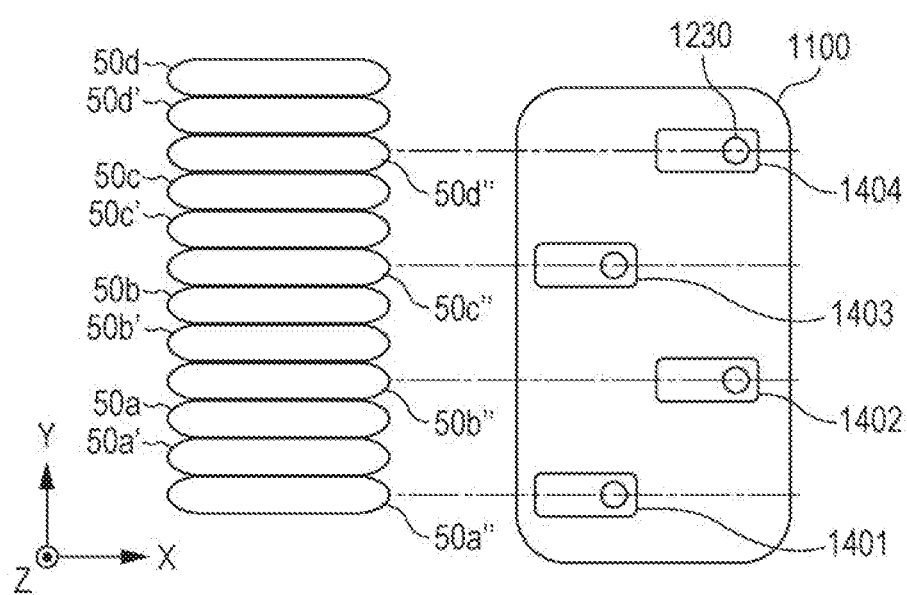
FIG. 8 is a plan view conceptually describing a relationship between an arrangement of a head unit and a formation configuration of a three-dimensionally shaped object in accordance with an embodiment of the invention.

FIG. 5 and FIGS. 6 to 8 show examples of how the head unit 1400 and the first discharge section 1230 are held in the head base 1100 in a plurality, and FIGS. 6 to 8 are external views of the head base 1100 from the direction of the arrow D in FIG. 2.

As shown in FIG. 5, a plurality of head units 1400 are held in the head base 1100 by fixing means (not shown). Also, as shown in FIGS. 6 to 8, the head base 1100 in accordance with the embodiment of the forming apparatus 2000 is provided with the head unit 1400 in which the four units of the head unit 1401 of the first row, the head unit 1402 of the second row, the head unit 1403 of the third row and the head unit 1404 of the fourth row are arranged in a zigzag (staggering) manner. As shown in FIG. 6, while the stage 120 is moved in the X direction with respect to the head base 1100 the shaping material is discharged from each head unit 1400 so that the layer forming portion 50 (layer forming portions 50*a*, 50*b*, 50*c*, and 50*d*) is formed. The formation order of the layer forming portion 50 will be described later. Here, the layer of the layer forming portion 50 formed by the discharge from the first discharge section 1230 corresponds to the first layer 310 and the layer of the layer forming portion 50 formed by the discharge of the second discharge section 1730 corresponds to the second layer 300.

Although not shown, the first discharge section 1230 provided in each of the head units 1401 to 1404 is configured to be connected to the first supply unit 1210 by the supply tube 1220 via the discharge driving section 1230*b*.

As shown in FIG. 5, the first discharge section 1230 discharges the material M which is a shaping material (pasty flowable material) from the discharge nozzle 1230*a* on the sample plate 121 placed on the stage 120. In the head unit 1401, a discharge mode in which the material M is discharged in a droplet state is illustrated, and in the head unit 1402, a discharge mode in which the material M is supplied in a continuous body state. The discharge mode of the material M may be in a droplet state or in a continuous body state, but the embodiment will be described in terms of the material M being discharged in a droplet state.

The material M discharged from the discharge nozzle 1230*a* in the droplet state flies in the direction of gravitational force and lands on the sample plate 121. The stage 120 moves so that the layer forming portion 50 is formed by the landing material M. A collection of the layer forming portion 50 forms the first layer 310 of the three-dimensionally shaped object 500 to be formed on the sample plate 121.

Next, the formation procedure of the layer forming portion 50 will be described with reference to FIGS. 6 to 8 and FIGS. 9 and 10.

Figure 9:
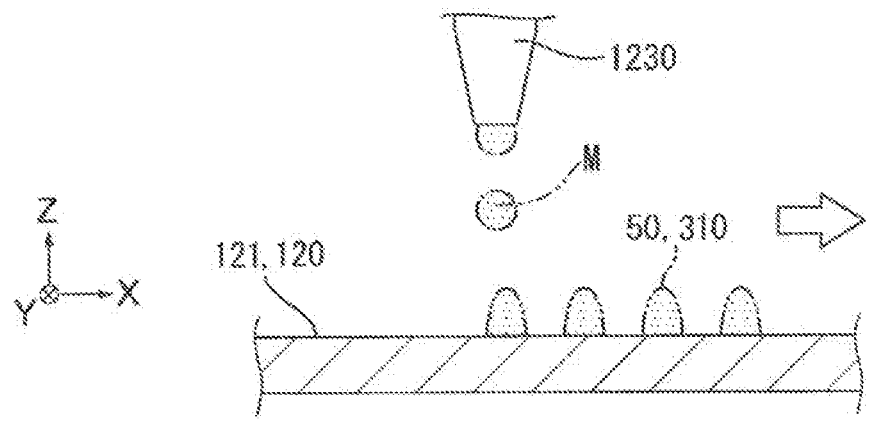
FIG. 9 is a schematic view conceptually describing the formation configuration of the three-dimensionally shaped object.
Figure 10:
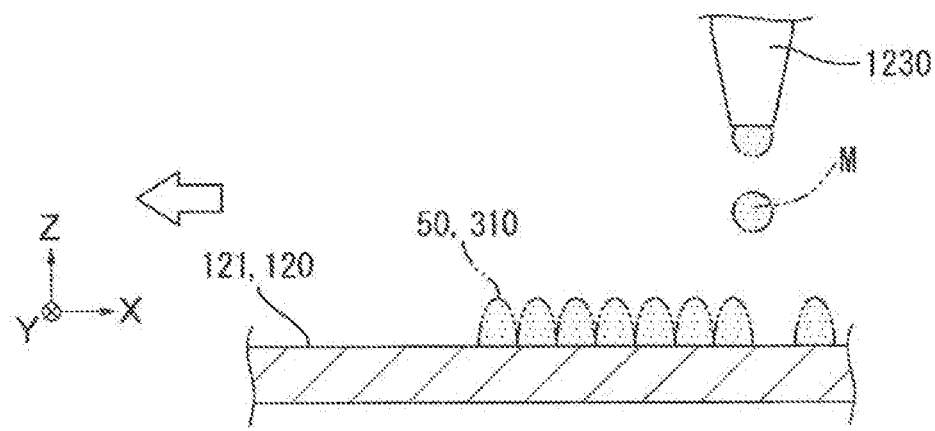
FIG. 10 is a schematic view conceptually describing the formation configuration of the three-dimensionally shaped object.

FIGS. 6 to 8 are plan view for conceptually describing the relationship between the disposition of the head unit 1400 and the formation mode of the layer forming portion 50 in accordance with the embodiment. FIGS. 9 and 10 are side views conceptually showing the formation mode of the layer forming portion 50.

First, when the stage 120 moves in the +X direction, the material M is discharged from the plurality of discharge nozzles 1230*a* and the material M is disposed at a predetermined position of the sample plate 121, so that the layer forming portion 50 is formed.

More specifically, as shown in FIG. 9, while the stage 120 is moved in the +X direction, the material M is disposed at a predetermined position on the sample plate 121 at predetermined intervals from the plurality of discharge nozzles 1230*a*.

Next, as shown in FIG. 10, while the stage 120 is moved in −X direction, the material M is disposed so as to fill the gap between the materials M disposed at predetermined intervals.

However, the configuration (not a configuration in which the layer forming portion 50 is formed not reciprocating movement of the stage 120 in X direction but a configuration in which the layer forming portion 50 is formed by the one-sided movement of the stage 120 in the X direction) may be such that the material M is disposed from the plurality of discharge nozzles 1230*a* to overlap (not to leave a vacancy) at a predetermined position of the sample plate 121 while the stage 120 is moved in the +X direction.

As shown in FIG. 6, by the formation of the layer forming portion 50 as described above, one line of each of the head units 1401, 1402, 1403, and 1404 in the X direction (share of one line in Y direction) of the layer forming portion 50 (layer forming portions 50*a*, 50*b*, 50*c*, and 50*d*) is formed.

Next, in order to form the layer forming portion 50' (layer forming portions 50*a'*, 50*b'*, 50*c'*, and 50*d'*) of the second line of each of the head units 1401, 1402, 1403, and 1404 in Y direction the head base 1100 is moved in Y direction. The moving distance is set to be P/n (n is a natural number) pitch in the −Y direction, P being the pitch between the nozzles. The embodiment will be described with n being three.

By the performance of the same operation as described in FIGS. 9 and 10, the layer forming portion 50' (layer forming portions 50*a'*, 50*b'*, 50*c'*, and 50*d'*) of the second line in the Y direction as shown in FIG. 7 is formed.

Next, in order to form the layer forming portion 50" (layer forming portions 50*a"*, 50*b"*, 50*c"*, and 50*d"*) of the third line of each of the head units 1401, 1402, 1403, and 1404) in the Y direction, the head base 1100 is moved in −Y direction. The moving distance is P/3 pitch in −Y direction.

By the performance of the same operation as described in FIGS. 9 and 10, the layer forming portion 50" (layer forming ports 50*a"*, 50*b"*, 50*c"*, and 50*d"*) of the third line in the Y direction as shown in FIG. 8 is formed, and the first layer 310 can be obtained.

One unit, or two or more units, of the head units 1401, 1402, 1403, and 1404 can discharge (supply) the shaping material different from the material M discharged from the first discharge section 1230. As a result, a three-dimensionally shaped object formed from different types of materials can be obtained with the forming apparatus 2000 in accordance with the embodiment.

Along with the formation of the first layer 310 as described above, the shaping material is discharged from the second discharge section 1730 in the layer 501 of the first layer so that the second layer 300 can be formed in the same manner. Then, even when the layers 502, 503, . . . , and 50*n* are formed in the layer 501 by stacking, the first layer 310 and the second layer 300 can be formed in the same manner. In the forming apparatus 2000 in accordance with the embodiment, when each layer (layers 501, 502, 503, . . . , and 50*n*) is formed, in the initial setting, each layer is not formed by the first layer 310 or the second layer 300 alone, but each layer is formed by both the first layer 310 and the second layer 300. The specific method of manufacturing a three-dimensionally shaped object with the forming apparatus 2000 in accordance with the embodiment will be described later.

The number and the arrangement of the head units 1400 and 1900 included in the forming apparatus 2000 according to the embodiment are not limited to the above-described numbers and arrangements. For example, FIGS. 11 and 12 schematically show examples of other arrangements of the head unit 1400 arranged in the head base 1100.

Figure 11:
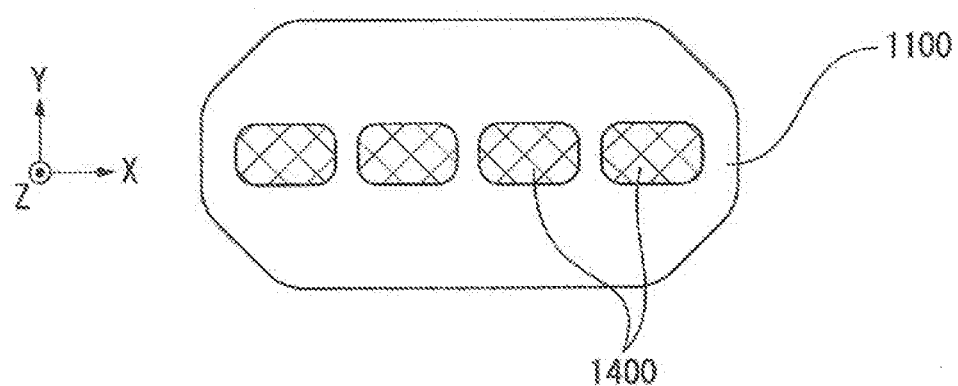
FIG. 11 is a schematic view showing an example of another arrangement of the head units arranged in the head base.
Figure 12:
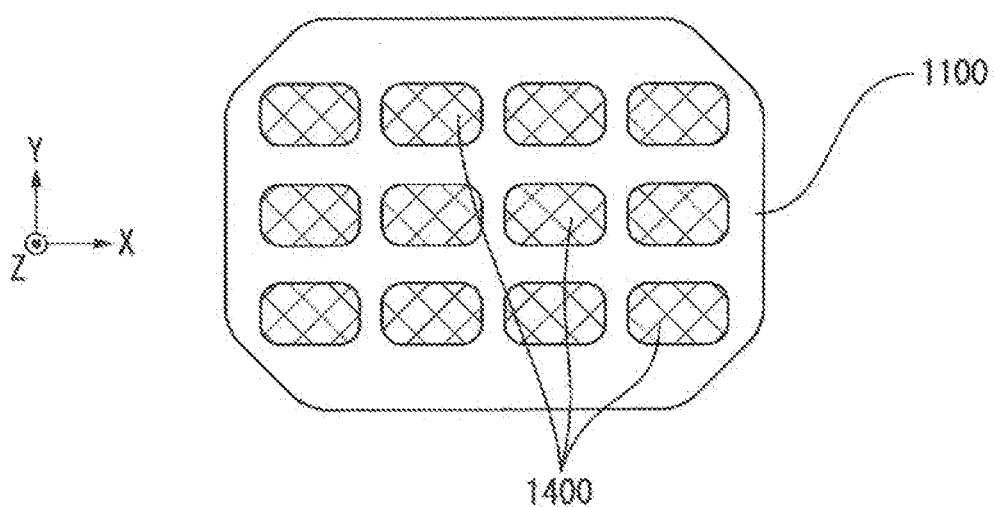
FIG. 12 is a schematic view showing an example of another arrangement of the head units arranged in the head base.

FIG. 11 shows a configuration in which a plurality of head units 1400 are juxtaposed in the head base 1100 in the X-axis direction. FIG. 12 shows a configuration in which the head units 1400 are arranged in a lattice pattern in the head base 1100. The number of head units arranged in either configuration is not limited to the illustrated example.

Next, the shaping material (paste for three-dimensional shaping) in accordance with the embodiment will be described in detail.

As the constituent material powder of the three-dimensionally shaped object 500 included in the shaping material, the powder made of single metal such as, for example, magnesium (Mg), iron (Fe), cobalt (Co), chromium (Cr), aluminum (Al), titanium (Ti), copper (Cu), and Nickel (Ni), powder of alloy containing one or more of these metals (maraging steel, stainless steel, cobalt chromium molybdenum, a titanium alloy, a nickel alloy, an aluminum alloy, a cobalt alloy, cobalt chromium alloy), or a mixed powder obtained by mixing various powders can be used. Further, powders of metals other than the above metals, oxide ceramics such as silicon dioxide, titanium dioxide, aluminum oxide, and zirconium oxide, and non-oxide ceramics such as aluminum nitride can also be used.

In addition, as the constituent material powder of the three-dimensionally shaped object 500, general-purpose engineering plastics such as polyamide, polyacetal, polycarbonate, modified polyphenylene ether, polybutylene terephthalate, polyethylene terephthalate and the like can be used. Resin powders such as polysulfone, polyethersulfone, polyphenylene sulfide, polyacrylate, polyimide, polyamide-imide, polyetherimide, engineering plastics such as polyether ether ketone and the like can also be used.

Further, a solvent can be included in the shaping material. As a solvent, for example, water; (poly) alkylene glycol monoalkyl ethers such as ethylene glycol monomethyl ether, ethylene glycol monoethyl ether, propylene glycol monomethyl ether, propylene glycol monoethyl ether and the like; acetic acid esters such as ethyl acetate, n-propyl acetate, iso-propyl acetate, n-butyl acetate, iso-butyl acetate and the like; aromatic hydrocarbons such as benzene, toluene, xylene and the like; ketones such as methyl ethyl ketone, acetone, methyl isobutyl ketone, ethyl-n-butyl ketone, diisopropyl ketone, and acetylacetone, and the like; alcohols such as ethanol, propanol, butanol and the like; tetraalkylammonium acetates; sulfoxide type solvents such as dimethyl sulfoxide, diethyl sulfoxide and the like; pyridine type solvents such as pyridine, γ-picoline, and 2,6-lutidine and the like; tetraalkylammonium acetate (for example, tetrabutylammonium acetate and the like); and ionic liquids such as butyl carbitol acetate and the like can be used. One kind or a combination of two or more kinds selected therefrom can be used.

Further, a binder may be included in the shaping material. As a binder, for example, acrylic resin, epoxy resin, silicone resin, cellulose resin or other synthetic resin or PLA (polylactic acid), PA (polyamide), PPS (Polyphenylene sulfide), PEEK (polyether ether ketone) or other thermoplastic resin can be used.

Further, as described above, when a compound is used as a shaping material, the powders of the metal described above, the oxide ceramics and the non-oxide ceramics, and the powder of the resins described above can be used as the constituent material powder of the shaping material. Together with such powder, wax and the like such as polystyrene, polypropylene, acrylic as a binder, phthalic acid ester as a thermoplastic agent and the like can be preferably used.

Next, an example of a method of manufacturing a three-dimensionally shaped object with the forming apparatus 2000 will be described with reference to a flowchart.

Figure 13:
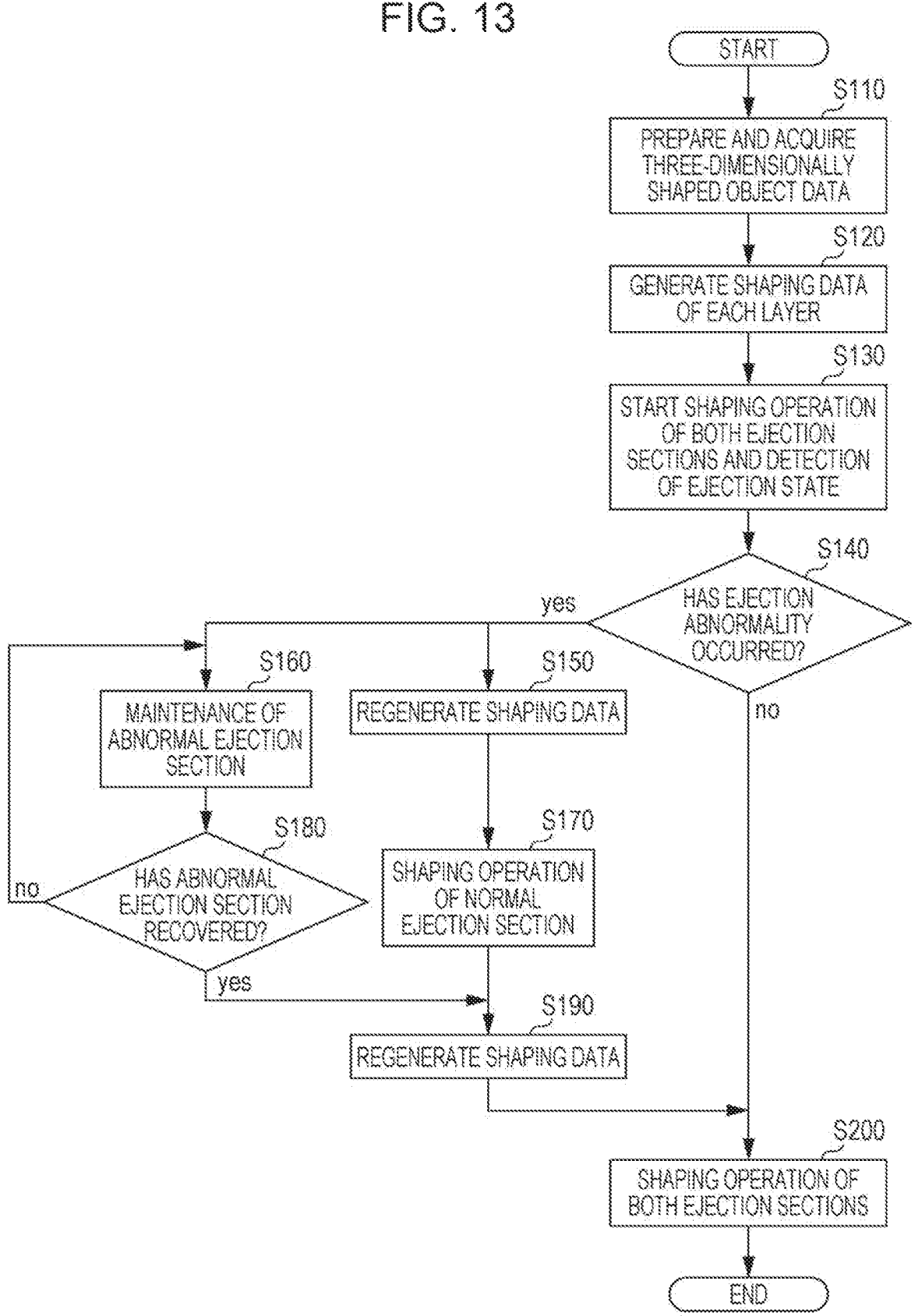
FIG. 13 is a flowchart of a method of manufacturing a three-dimensionally shaped object in accordance with an embodiment of the invention.

Here, FIG. 13 is a flowchart of a method of manufacturing a three-dimensionally shaped object in accordance with the embodiment.

Figure 14:
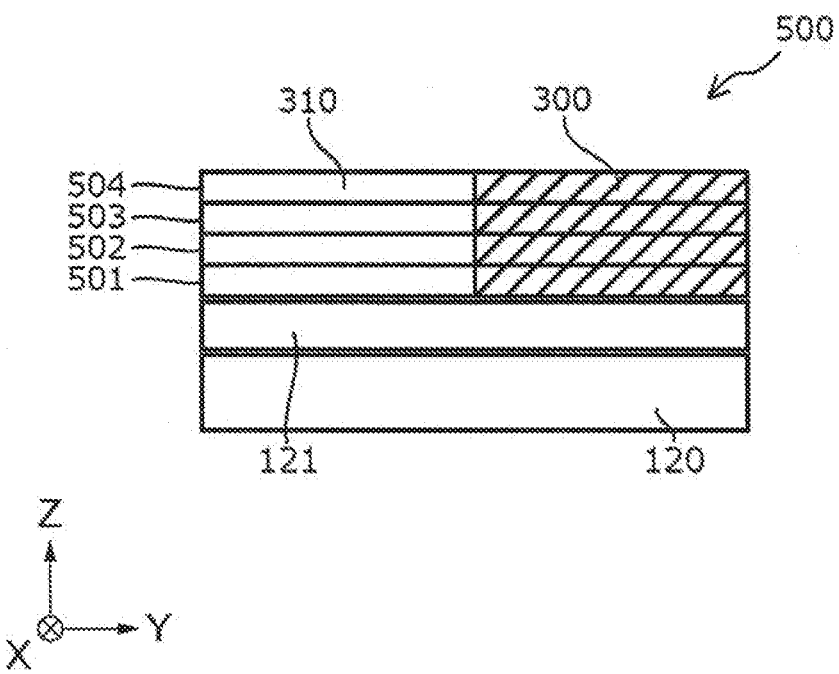
FIG. 14 is a schematic sectional view showing an example of a three-dimensionally shaped object formed with an apparatus for manufacturing a three-dimensionally shaped object in accordance with an embodiment of the invention.
Figure 15:
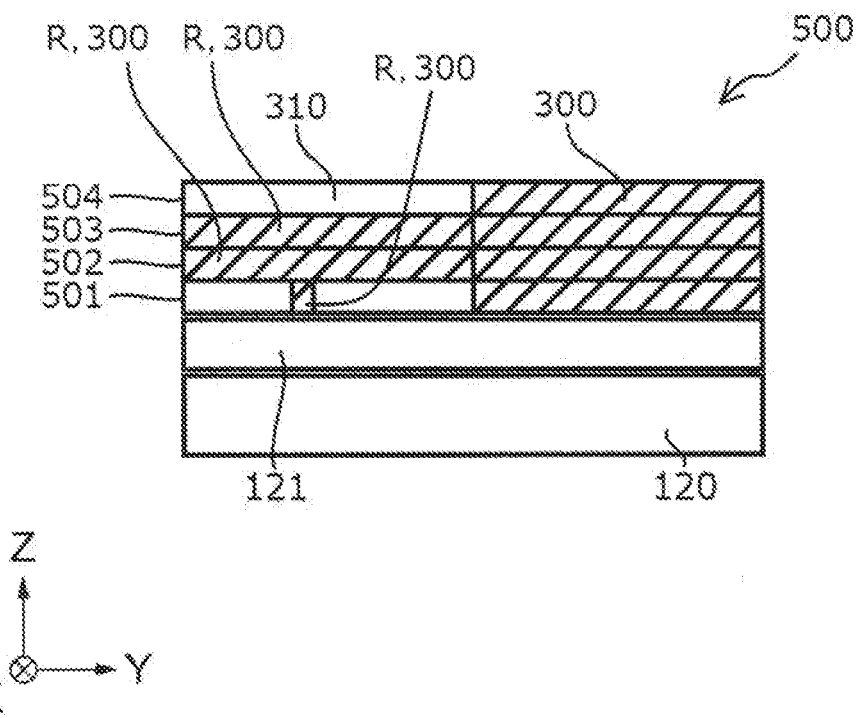
FIG. 15 is a schematic sectional view showing an example of a three-dimensionally shaped object formed with an apparatus for manufacturing a three-dimensionally shaped object in accordance with an embodiment of the invention.

FIGS. 14 and 15 are schematic sectional views showing an example of the three-dimensionally shaped object 500 formed by the forming apparatus 2000 (method of manufacturing the present three-dimensionally shaped object). FIG. 14 shows a case in which no ejection abnormality has occurred in any of the head base 1100 and the head base 1600 as the ejection section (a case in which there is no need to perform maintenance) during the manufacturing of the three-dimensionally shaped object. FIG. 15 shows a case in which an ejection abnormality occurs in the head base 1100 (when the head base 1100 is subjected to maintenance) during the manufacturing of a three-dimensionally shaped object.

As shown in FIG. 13, in the method of manufacturing a three-dimensionally shaped object in accordance with the embodiment, at first, data of the three-dimensionally shaped object 500 (three-dimensionally shaped object data) is prepared and acquired with a personal computer in the step S110. Specifically, for example, data (three-dimensionally shaped object data) showing the shape of the three-dimensionally shaped object 500 is prepared with the 3DCAD software or 3DCG software which is executed in a personal computer. Alternatively, the data (three-dimensionally shaped object data) can be acquired with a device called a 3D scanner which scans an object and converts the scanning into a 3D data, or 3D data can be downloaded from a cloud in which the 3D data is stored.

Next, a conversion is made into a 3D data format called STL format. If the 3DCAD software or the 3DCG software outputs the data in the STL format, the conversion is not necessary.

Next, in the step S120, shaping data for each layer is generated. Specifically, in the data (three-dimensionally shaped object data) showing the shape of the three-dimensionally shaped object 500 in the STL format, the data in the STL format (three-dimensionally shaped object data) is sliced layer by layer in accordance with the shaping resolution of the Z direction, and bitmap data (section data) for each section corresponding to each layer (layers 501, 502, 503, ..., and 50$n$) is generated. The shaping data generated in this step is based on the premise that both the head base 1100 and the head base 1600 (the first discharge section 1230 and the second discharge section 1730) are used. Data generation from the step S110 to the step S120 may be performed by a personal computer installed in the forming apparatus 2000 or data generation may be performed by a separate personal computer, the data being transferred to the forming apparatus 2000.

Next, in the step S130, under the control of the control unit 400, the shaping material is discharged from both the head base 1100 and the head base 1600 (the first discharge section 1230 and the second discharge section 1730) on the basis of the shaping data generated in the step S120, and the layer forming portion 50 (the first layer 310 and the second layer 300) starts to be formed on the basis of the shaping data.

Here, the layer 501 in FIG. 14 shows a case in which no ejection abnormality has occurred in any of the head base 1100 and the head base 1600, and the layer 501 in FIG. 15 shows a case in which an ejection abnormality has occurred in the head base 1100.

In the step S130, the detection section S1 and the detection section S2 start to detect the ejection state of the shaping material from the head base 1100 and the head base 1600 (the first discharge section 1230 and the second discharge section 1730) in synchronization with the start of the shaping operation. Specifically, the detection section S1 and the detection section S2 capture the image of the layer forming portion 50 formed in this step immediately after its formation.

Next, in the step S140, the control unit 400 determines whether or not an ejection abnormality has occurred in the head base 1100 and the head base 1600 on the basis of the detection results (captured images) of the detection section S1 and the detection section S2.

If it is determined that the ejection abnormality has not occurred, the process moves to the step S200, and the shaping operation is executed (continued) by both the head base 1100 and the head base 1600 uninterrupted.

On the other hand, if it is determined that the ejection abnormality has occurred, the process moves to the step S150 and moves to the step S160 so that the shaping data is regenerated (step S150) and maintenance (wiping) of the abnormal ejection section in which it is determined that the ejection abnormality has occurred is performed (step S160). Here, the step S150 and the step S160 are performed at the same time.

The regeneration of the shaping data in the step S150 is data generation for executing the shaping operation (step S170) with the normal ejection section alone. After the shaping data is regenerated in the step S150, the shaping operation is performed with the normal ejection sections alone in the step S170 until it is determined in step S180 that the abnormal ejection section has recovered.

The maintenance of the abnormal ejection section in the step S160 is wiping with the wiper W1 or the wiper W2. After the maintenance is terminated, whether or not the abnormal ejection section has recovered is determined in the step S180.

The determination as to whether or not the abnormal ejection section has recovered in the step S180 is performed by the control unit 400. For example, the determination is performed by ejecting the shaping material from an ejection section in which an abnormality has occurred at a position different from the shaping position of the three-dimensionally shaped object 500 and causing the detection section S1 or the detection section S2 to detect the ejection state of the ejection section in which an abnormality occurred. However, the determination is not limited to such a method.

When the control unit 400 determines that the abnormal ejection section has recovered in the step S180, the process moves to the step S190.

In the step S190, the shaping data is regenerated so that the shaping operation can be performed again by both the head base 1100 and the head base 1600. Then, in the step S200, the shaping operation is performed by both the head base 1100 and the head base 1600 on the basis of the shaping data generated in the step S190.

Then, with the termination of the shaping operation on the basis of the data of the three-dimensionally shaped object 500 acquired in step S110, the method of manufacturing the three-dimensionally shaped object of this example ends.

FIG. 14 shows an example of the three-dimensionally shaped object 500 formed by the steps S140 and S200 being repeated four times (for four layers from the layer 501 to the layer 504) without an ejection abnormality.

In other words, the three-dimensionally shaped object 500 shown in FIG. 14 is formed by the process of the step S110 to the step S140 and thereafter four-time repetition of the process of the steps S140 and S200 in the four layers of layer 501, layer 502, layer 503, and layer 504.

On the other hand, FIG. 15 shows an example of the three-dimensionally shaped object 500, in which an ejection abnormality occurs in the head base 1100 in the process of forming the layer 501, the region R corresponding to the ejection abnormality in the layer 501 (the second layer 300 is formed instead of the first layer 310) is supplemented by the head base 1600, the entire layer 502 and layer 503 (region including the region R corresponding to the ejection abnormality in the layer 502 and the layer 503) are formed by the head base 1600 while the maintenance of the head base 1100 is performed, and the layer 504 is formed by both the head base 1600 and the recovered head base 1100.

In other words, the three-dimensionally shaped object 500 shown in FIG. 15 is formed as follows. The process of the step S110 to the step S140 is performed, and then the process from the step S150 to the step S180 is repeated three times for the three layers of the layer 501, the layer 502, and the layer 503. Thereafter, the layer 504 is formed by the step S140 and the step S200.

A supplementation of the region R corresponding to the ejection abnormality in the layer 501 may be performed by moving the head base 1600 along the head base 1100 (the formation speed of the layer 501 can be raised), or by moving the head base 1600 independent of the movement of the head base 1100 (time for regenerating the shaping data can be easily secured).

To summarize the method of manufacturing the three-dimensionally shaped object in accordance with the embodiment, the method of manufacturing the three-dimensionally shaped object in accordance with the embodiment is a method of manufacturing a three-dimensionally shaped object by which a three-dimensionally shaped object 500 is manufactured by stacking layers and can be executed by an apparatus (forming apparatus 2000) for manufacturing the three-dimensionally shaped objects that is provided with a plurality of ejection sections (head base 1100 and head base 1600) that eject the shaping materials on the basis of the shaping data of the three-dimensionally shaped object 500, the detection section (detection section S1 and detection section S2) capable of detecting the ejection state of the shaping material from the ejection section, and the maintenance section (wiper W1 and wiper W2) that performs the maintenance of the ejection section.

When the detection section detects an ejection abnormality of the shaping material in any of the ejection sections (step S140), the maintenance section is caused to perform the maintenance of the abnormal ejection section in which the ejection abnormality is detected (step S160), and the shaping material is ejected by the normal ejection section in which no ejection abnormality is detected at a position where the shaping material is to be ejected from the abnormal ejection section (step S170) while the maintenance of the abnormal ejection section is performed by the maintenance section.

That is, when an ejection abnormality is detected by the apparatus for manufacturing a three-dimensionally shaped object provided with a plurality of ejection sections, the methods of manufacturing a three-dimensionally shaped object in accordance with the embodiment are causing that the maintenance of the abnormal ejection section in which the ejection abnormality is detected is performed and causing the normal ejection section to eject the shaping material at a position where the shaping material is to be ejected from the abnormal ejection section while the maintenance of the abnormal ejection section is performed. Therefore, the interruption of the formation of the layer can be suppressed, and the decline of manufacturing efficiency of the three-dimensionally shaped object 500 can be suppressed.

From the viewpoint of an apparatus for manufacturing a three-dimensionally shaped object, the apparatus (forming apparatus 2000) for manufacturing the three-dimensionally shaped object in accordance of the embodiment is an apparatus for manufacturing a three-dimensionally shaped object 500 by stacking layers and is provided with a plurality of ejection sections (head base 1100 and head base 1600) that eject the shaping materials on the basis of the shaping data of the three-dimensionally shaped object 500, the detection section (detection section S1 and detection section S2) capable of detecting the ejection state of the shaping material from the ejection section, the maintenance section (wiper W1 and W2) that performs the maintenance of the ejection section, and the control section (control unit 400) that controls the ejection section, the detection section and the maintenance section.

When the detection section detects the ejection abnormality of the shaping material in any of the ejection sections, the control section causes the maintenance section to perform the maintenance of the abnormal ejection section in which the ejection abnormality is detected and causes the normal ejection section in which no ejection abnormality is detected to eject the shaping material at a position where the shaping materials is to be ejected from the abnormal ejection section while the maintenance of the abnormal ejection section is performed by the maintenance section.

That is, when an ejection abnormality is detected, the forming apparatus 2000 in accordance with the embodiment, provided with a plurality of ejection sections, causes the maintenance section to perform the maintenance of the abnormal ejection section in which the ejection abnormality is detected and causes the normal ejection section to eject the shaping material at a position where the shaping material is to be ejected from the abnormal ejection section while the maintenance of the abnormal ejection section is performed. Therefore, the interruption of the formation of the layer can be suppressed, and the decline in the manufacturing efficiency of the three-dimensionally shaped object can be suppressed.

For example, as shown by the region R corresponding to the ejection abnormality in FIG. 15, when the detection section S1 or the detection section S2 detects the ejection abnormality of the shaping materials in either of the head base 1100 or the head base 1600, the control unit 400 in the forming apparatus 2000 in accordance with the embodiment regenerates the shaping data (step S150) so as to cause the normal ejection section (head base 1600) to eject the shaping material at a position (region R corresponding to ejection abnormality) where the shaping material is to be ejected from the abnormal ejection section (head base 1100).

Therefore, the shaping data by which the shaping material is to be ejected from the abnormal ejection section is revised into the shaping data by which the shaping material is ejected from the normal ejection section so that the shaping material can be ejected by the normal ejection section as deemed appropriate at a position where the shaping material is to be ejected from the abnormal ejection section.

In the forming apparatus 2000 in accordance with the embodiment, the control unit 400 is configured to be capable of regenerating the shaping data for each layer of one layer when the detection section S1 or the detection section S2 detects an ejection abnormality of the shaping material in either the head base 1100 or the head base 1600.

Therefore, since the shaping data is regenerated for each layer of one layer, the forming apparatus 2000 in accordance with the embodiment is capable of ejecting the shaping material from the normalized ejection section as soon as the abnormal ejection section turn normal by the maintenance.

Furthermore, in the forming apparatus 2000 in accordance with the embodiment, when the detection section S1 or the detection section S2 detects an ejection abnormality of the shaping material in either the head base 1100 or the head base 1600, the control unit 400 is configured to be capable of changing the number of layers for which the shaping data is set to be regenerated on the basis of the state of the ejection abnormality detected by the detection section S1 or the detection section S2. Specifically, in the case of a serious ejection abnormality such as no ejection at all, it takes time to perform maintenance so that the shaping data can be set to be regenerated for a large number of layers (for example, three layers), and in the case of a light ejection abnormality such as the ejection amount being slightly less than usual, it does not take much time to perform maintenance so that the shaping data can be set to be regenerated for a small number of layers (for example, one layer). Therefore, the forming apparatus 2000 in accordance with the embodiment is configured to be capable of suppressing the decline of the manufacturing efficiency of the three-dimensionally shaped object 500 efficiently.

However, the invention is not limited to such a configuration and may be configured to regenerate the shaping data for each layer of a plurality of layers uniformly when an ejection abnormality of the shaping material is detected.

In the forming apparatus 2000 in accordance with the embodiment, the maintenance section, being the wiper W1 and the wiper W2, is configured to be capable of wiping operation as a maintenance operation. However, as described above, there is no particular limit to the configuration of the maintenance section. A cap for capping the head base 1100 and the head base 1600, a suction mechanism for sucking the shaping material of the head base 1100 and the head base 1600 from the first discharge section 1230 and the second discharge section 1730, and the like may be provided.

As described above, a plurality of types of maintenance contents such as a wiping operation and a suction operation can be executed, and in the case where the detection section detects an ejection abnormality of the shaping material in any of the ejection sections, it is particularly preferable that the control section be configured to be capable of changing the maintenance contents executed by the maintenance section. Since the maintenance contents can be changed on the basis of the state of the ejection abnormality, the maintenance of the abnormal ejection section can be performed efficiently.

Also, as described above, the determination as to whether or not the abnormal ejection section has recovered in the step S180 is performed by the control unit 400, and the determination is performed by ejecting the shaping material from the ejection section in which an abnormality occurred at a position different from the shaping position of the three-dimensionally shaped object 500 and causing the detection section S1 or the detection section S2 to detect the ejection state of the ejection section in which ejection abnormality occurred.

In other words, in the forming apparatus 2000 in accordance with the embodiment, the control unit 400 can cause the ejection section to eject the shaping material at a position different from the shaping position of the three-dimensionally shaped object 500 and the detection section to detect the ejection state of the ejection section.

With such a configuration of the forming apparatus 2000 in accordance with the embodiment, the ejection state of the ejection section can be accurately detected free from the impact of the state of the lower layer accompanying the stacking of the three-dimensionally shaped object 500.

In addition, as described above, in the step S130, the detection section S1 and the detection section S2 start to detect the ejection state of the shaping material from the head base 1100 and the head base 1600 (the first discharge section 1230 and the second discharge section 1730).

In other words, in the forming apparatus 2000 in accordance with the embodiment, the control unit 400 can cause the detection section to detect the ejection state of the ejection section on the basis of the shape of the three-dimensionally shaped object 500 in the process of shaping.

Since the forming apparatus 2000 in accordance with the embodiment has such a configuration, the ejection state of the ejection section is detected on the basis of the shape of the three-dimensionally shaped object 500, so that the operation that is not involved in the shaping operation of the three-dimensionally shaped object 500 can be eliminated and the ejection state of the ejection section can be detected efficiently.

However, there is no particular limit to the method of detecting the ejection state of the ejection section by the detection section, and the shaping material may be ejected from the ejection section at a position different from the shaping position of the three-dimensionally shaped object 500 and the ejection state of the ejection section may be detected by detection section in the step S130. Alternatively, the detection section may be caused to detect the ejection state of the ejection section on the basis of the shape of the three-dimensionally shaped object 500 in the step S180.

The invention is not limited to the above-described embodiments, but can be realized in various configurations without departing from the spirit thereof. For example, the technical features in the embodiments corresponding to the technical features in each embodiment described in the summary of the invention can be replaced or combined as deemed appropriate to solve some or all of the problems stated above or to achieve some or all of the effects described above. If the technical features are not described as essential in the specification, the technical features can be deleted as deemed appropriate.

What is claimed is:

1. An apparatus for manufacturing a three-dimensionally shaped object, the apparatus comprising:
    a base on which the three-dimensionally shaped object is formed, the base being divided into first and second areas next to each other;
    a first head having a first nozzle, a first material being discharged from the first nozzle onto only the first area of the base in a first mode and onto the first and second areas of the base in a second mode to form the three-dimensionally shaped object;
    a first image sensor configured to capture a first image of the discharged first material on the base, the first image sensor being attached to the first head;
    a first wiper configured to wipe a tip of the first nozzle;
    a second head having a second nozzle, a second material being discharged from the second nozzle onto only the second area of the base in the first mode and onto the first and second areas of the base in a third mode to form the three-dimensionally shaped object;
    a second image sensor configured to capture a second image of the discharged second material on the base, the second image sensor being attached to the second head;
    a second wiper configured to wipe a tip of the second nozzle; and
    a controller configured to execute instructions so as to:
        cause the first and second heads to move relative to the base at the same time and to eject the first and second materials onto the first and second areas of the base, respectively;
        detect a first ejection abnormal state of the first nozzle based on the captured first image;
        wipe the tip of the first nozzle by the first wiper after the controller detects the first ejection abnormal state;
        detect a second ejection abnormal state of the second nozzle based on the captured second image;
        wipe the tip of the second nozzle by the second wiper after the controller detects the second ejection abnormal state;
        select the first mode for the first and second heads when the controller does not detect the first and second ejection abnormal states so that the first nozzle discharges the first material onto only the first area of the base and the second nozzle discharges the second material onto only the second area of the base;
        select the third mode for the second head when the controller detects the first ejection abnormal state so that the second nozzle discharges the second material onto the first and second areas of the base while the first wiper wipes the tip of the first nozzle; and
        select the second mode for the first head when the controller detects the second ejection abnormal state so that the first nozzle discharges the first material onto the first and second areas of the base while the second wiper wipes the tip of the second nozzle,
    wherein the first material and the second material are the same.

2. The apparatus for manufacturing the three-dimensionally shaped object according to claim 1,
    wherein the controller is configured to control the first head based on first shaping data and control the second head based on second shaping data that is different from the first shaping data,
    wherein, when the controller detects the first ejection abnormal state, the controller regenerates the second shaping data for the second head so that the second nozzle discharges the second material onto the first and second areas of the base in the third mode, and
    when the controller detects the second ejection abnormal state, the controller regenerates the first shaping data for the first head so that the first nozzle discharges the first material onto the first and second areas of the base in the second mode.

3. The apparatus for manufacturing the three-dimensionally shaped object according to claim 2,
    wherein the three-dimensionally shaped object is formed by stacking layers of the first and second materials,
    wherein, when the controller detects the first and second ejection abnormal states, the controller selects a number of the stacking layers, and
    the selected number of the stacking layers are formed in one of the second mode or the third mode after the controller regenerates one of the first shaping data for the first head or the second shaping data for the second head.

4. The apparatus for manufacturing the three-dimensionally shaped object according to claim 1,
    wherein the controller causes the first and second nozzles to discharge the first and second materials at a position on the base that is different from a shaping position of the three-dimensionally shaped object in the second and third mode, detects a discharge state of the first and second materials on the base in the second and third mode, and determines whether the first and second ejection abnormal states are resolved.

5. The apparatus for manufacturing the three-dimensionally shaped object according to claim 1, wherein the controller detects a discharge state of the first and second materials on the base based on a shape of the three-dimensionally shaped object in the captured first and second images.

* * * * *